United States Patent [19]
Howard

[11] 3,799,174
[45] Mar. 26, 1974

[54] MOLDED BREAST CUP AND METHOD OF MAKING THE SAME

[75] Inventor: Jack E. Howard, Los Angeles, Calif.

[73] Assignee: International Fabric Molders, Inc., Los Angeles, Calif.

[22] Filed: June 26, 1972

[21] Appl. No.: 266,268

[52] U.S. Cl................... 128/464, 156/224, 156/245
[51] Int. Cl............................ A41c 3/00, A41c 5/00
[58] Field of Search ........... 128/463, 464, 477, 478, 128/479, 480, 481, 516, 517; 156/245, 224, 264/324

[56] References Cited
UNITED STATES PATENTS

| | | | |
|---|---|---|---|
| 2,609,539 | 9/1952 | Shearer............................ | 128/464 |
| 2,896,623 | 7/1959 | Fitzgerald..................... | 128/463 UX |
| 3,064,329 | 11/1962 | Westberg et al................ | 128/463 X |
| 3,202,565 | 8/1965 | Loftin........................... | 128/463 X |

Primary Examiner—Werner H. Schroder
Attorney, Agent, or Firm—Robert C. Comstock

[57] ABSTRACT

A complete molded breast cup which is unitary and seamless and which is ready for use in a brassiere or other garment. The breast cup is molded from a composite formed by lightly adhering together the adjacent surfaces of an outer layer of fabric, an inner layer of fabric and an intermediate layer of non-woven fiberfill material. The three layers preferably comprise or contain a substantial quantity of polyester material, so that they have compatible heat forming characteristics. The composite is molded into a three dimensional shape in closed molds to form a unitary integral breast cup having smooth seamless interior and exterior surfaces.

10 Claims, 4 Drawing Figures

PATENTED MAR 26 1974 3,799,174

MOLDED BREAST CUP AND METHOD OF MAKING THE SAME

BACKGROUND OF THE INVENTION

1. Field of the Invention

The invention relates to a molded seamless breast cup and to a method of making a complete breast cup in a single molding operation. The invention relates particularly to such a breast cup which incorporates non-woven fiberfill padding.

2. Description of the Prior Art

At the present time, all fiberfill pads for breast cups must be cut, shaped and then sewn or glued along a seam. The brassiere usually requires a double layer of outer covering fabric in order to conceal the seam. Although such brassieres are advertised as seamless, they are not truly seamless because of the seams required in making the pads.

Forming a fiberfill or other padded breast cup for a brassiere presently requires a number of separate operations in which the pad is formed and is then covered on the inside by an inner lining and on the outside by one or more layers of outer fabric. The manufacturing and assembly time required is accordingly substantial. The inner lining and outer layers often do not fit properly or it is difficult and time consuming to achieve a proper fit.

Fiberfill pads of the type now in use are customarily molded into shape in a heated mold wherein the resins incorporated in the fiberfill material are molded so that they flow around the fibers and give the finished product the desired shape.

SUMMARY OF THE INVENTION

The present invention provides for the first time a complete seamless breast cup which is ready for use in a brassiere and which is formed entirely in a single molding operation. The cup incorporates non-woven fiberfill padding which is formed simultaneously with the cup and which is likewise seamless.

It is accordingly possible with the present invention to form the outer cover, intermediate padding and inner lining in one molding operation to provide a complete seamless breast cup which is ready for immediate sewing into a brassiere.

The invention thus provides substantial economies for the brassiere manufacturer and for the ultimate purchaser through savings in manufacturing and labor costs. At the same time, the invention provides a better and greatly improved product in which the breast cup is for the first time completely and entirely seamless. There is accordingly no need to utilize extra layers of outer fabric in order to conceal seams.

In essence, the invention contemplates laminating the three layers comprising the inner lining, intermediate padding and outer cover to each other to form an integral composite. This composite is then molded by a cold molding process in which the composite is heated and the molds are unheated. The heated composite is then subjected immediately after heating to substantial pressure within molds to form the composite into the three dimensional shape of a breast cup.

The molding operation forms the product by changing the shape of the polyester or other fiber portion of the non-woven fiberfill, rather than by melting the resin filler.

A breast cup constructed in accordance with the present invention provides the wearer with a better fit because the cup truly takes on the shape of the mold instead of taking its shape from the breast of the wearer.

The breast cup also has substantially improved washing characteristics both as to resistance to heat and avoidance of shrinking. The cup can absorb more heat without distorting or losing its formed shape.

With the present invention, there is a smooth and perfect fit between the three layers of the cup as opposed to the prior art, in which cut and sewn outer and/or inner layers cannot be made to have a perfect fit.

The invention also provides a breast cup in which there is no thinning of the apex during molding and the thickness of the intermediate layer is the same throughout the entire cup.

The present invention also provides a complete molded breast cup in which all of the materials used are compatible with each other and have identical or substantially similar forming characteristics so that they can be molded and formed simultaneously and do not react in an incompatible manner.

It is accordingly among the objects of the invention to provide a complete seamless breast cup and method of making the same having all of the advantages and benefits set forth above.

The invention also comprises such other objects, advantages and capabilities as will later more fully appear and which are inherently possessed by the invention.

While there is shown in the drawings a preferred embodiment of the invention, it should be understood that the same is susceptible of modification and change without departing from the spirit of the invention.

DESCRIPTION OF THE PREFERRED EMBODIMENT

Figure 1:
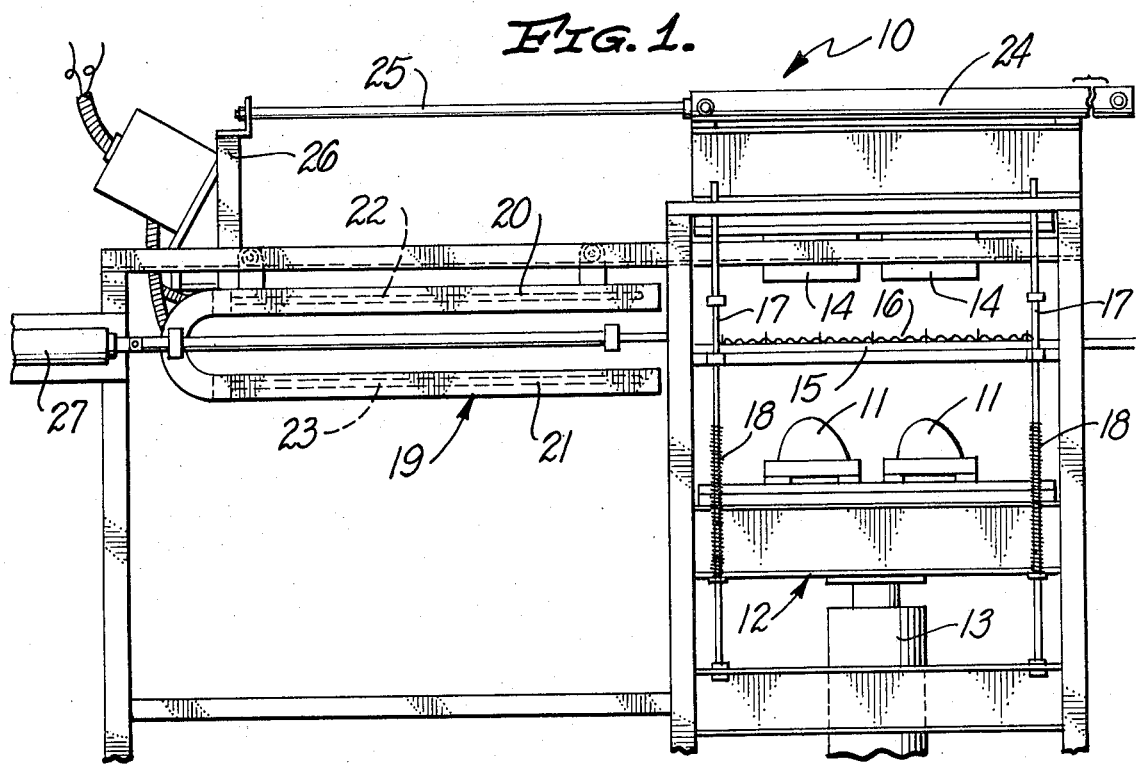
FIG. 1 is a side elevational view of a hydraulic press of the type used in molding the breast cups of the present invention.
Figure 2:
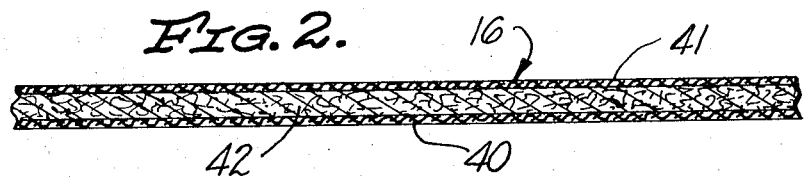
FIG. 2 is an enlarged sectional view of the composite from which the breast cups are molded.
Figure 4:
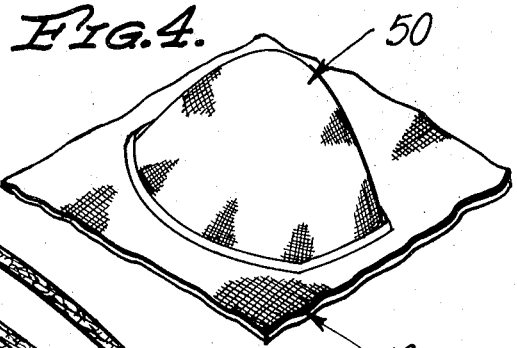
FIG. 4 is an isometric view of a molded breast cup before it is cut from the surrounding unmolded composite.
Figure 3:
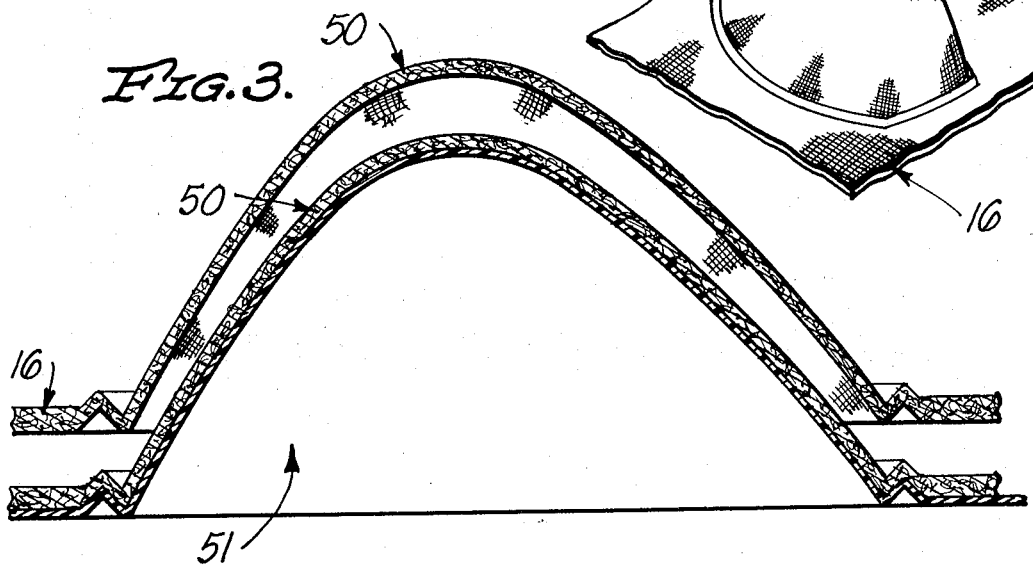
FIG. 3 is a sectional view showing molded breast cups being placed on a supporting blank.

A preferred embodiment which has been selected to illustrate my invention comprises a complete molded breast cup and method of making the same which utilizes a hydraulic molding press 10. A plurality of male molds 11 are molded on a support member 12 which is mounted for vertical reciprocal movement by a hydraulic ram 13, which has the upper end of its piston connected to the support member 12.

A plurality of complementary stationary female molds 14 are mounted directly above the male molds 11. A frame 15 extends horizontally between the molds 11 and 14 and is adapted to hold composite 16 for molding. The frame 15 is mounted for vertical reciprocal movement on guide rods 17. Coil springs 18 mounted on the guide rods 17 exert pressure urging the frame 15 and composite 16 upwardly when the molds are closed.

A substantially U-shaped heater rack 19 is mounted for sliding reciprocal horizontal movement between two positions, in one of which its upper portion 20 and lower portion 21 are disposed directly above and beneath the composite 16 and extend substantially parallel thereto. This is the heating or operating position, in which heat is applied to the composite 16 to prepare it for the molding operation.

The heater rack 19 is moved from this position to a retracted or non-operating position in which it is slidably moved horizontally outwardly so that the molds can be closed to perform the molding operation after the composite 16 has been sufficiently heated.

The upper portion 20 and lower portion 21 of the heater rack 19 have a plurality of electrically operated U-shaped heating rods. Reciprocal movement of the heater rack 19 is effected by the operation of a hydraulic cylinder 24, which is mounted in the upper part of the press 10. The end of its piston 25 is connected to a vertically directed arm 26 which is in turn connected to the heater rack 19. A shock absorber 27 is provided to cushion the movement of the heater rack 19.

Prior to the molding operation, the composite 16 is formed by lamination. The composite 16 preferably includes a smooth inner layer 40 of cloth which preferably comprises polyester material or contains a substantial quantity of polyester material. An outer layer 41 may comprise a single layer or a multiple layer, one of which may be lace for decorative purposes. The outer layer 41 also preferably comprises polyester material or contains a substantial quantity of polyester material.

An intermediate layer 42 of non-woven synthetic fiberfill material is disposed between the inner layer 40 and outer layer 41. The intermediate layer 42 preferably has a substantial thickness such as one-eighth inch or more before molding. The intermediate layer 42 also preferably comprises polyester material. One such fiberfill which has been found to be satisfactory is "Pelon", which is made and sold by Pelon Corporation, 1120 Avenue of the Americas, New York, N.Y. 10036.

The three layers 40, 41 and 42 which form the composite 16 are preferably laminated together with a light application of suitable adhesive material along their engaging surfaces. The laminating operation customarily includes the application of pressure to form a bond between the layers. It is believed to be important that the layers should be only very lightly bonded together. It is particularly important that the outer layer 41 be only lightly bonded, almost tacked to the intermediate layer 42. This leaves the outer layer 41 more free to change its position with respect to the intermediate layer 42 during the molding operation. Tight bonding of the layers forming the composite 16 will cause wrinkling and improper molding.

After the composite 16 has been formed by lamination, a piece of the composite 16 is placed on the frame 15. The cylinder 24 is then energized to move the heater rack 19 to its operating position. Heat is then applied to the heating rods 22 and 23 and transferred by radiation to the composite 16. After the composite 16 has been substantially heated, the heater rack 19 is retracted and the hydraulic ram 13 energized to move the support member 12 and male molds 11 upwardly. The male molds 11 engage the composite 16 as they move upwardly and carry the composite 16 and frame 15 upwardly so that the composite 16 is held between the closed molds.

The molds remain closed a short period of time while the molding operation is completed. The ram 13 is then released to retract its piston and thereby move the support member 12 and male molds 11 back down to their normal positions. The frame 15 moves back to its normal position and the molded composite 16 is then removed from the frame 15.

It will be noted that the molds 11 and 14 are left unheated and only the composite 16 is heated. The molds accordingly act as a heat sink for dissipation of heat from the heated composite 16.

In the molding operation, all of the layers forming the composite 16 are molded simultaneously and permanently into the shape of the molds 11 and 14. The molds 11 and 14 should preferably be "closed" molds, which means that there is no space between the outer surface of the male mold 11 and the inner surface of the female mold 14 when the molds are in closed position.

During the molding operation, the intermediate layer 42 is completely compressed, but it recovers part of its thickness after the molding is completed. There is no thinning of the intermediate layer 42 at the apex and its thickness is the same through the entire cross section of the pad.

The molding operation forms the composite 16 into a complete composite breast cup 50 in which all of the layers are bonded together and are formed into the shape of the molds 11 and 14. The cup 50 will retain its molded contour substantially indefinitely, even after laundering if it is not subjected to intensely high temperatures. Due to the molded fiberfill intermediate layer, the cup 50 resists wrinkling and tends to remain in its molded three dimensional shape instead of collapsing and becoming flat.

In the molding operation, the polyester fabric of all three layers is shaped simultaneously. As long as all three layers have identical or comparable forming characteristics, they can be molded simultaneously as a composite in the manner set forth above.

When the cups 50 are first molded, it has been found desirable to place them on a substantially rigid blank 51, which may be formed of suitable plastic material utilizing the same press 10 and molds 11 and 14. The blank 51 holds the cups 50 in their molded three dimensional contour while the cups are cooling. The cups may become wrinkled or deformed if they are placed on a flat surface before they are completely cool.

I claim:

1. A complete molded breast cup for use in brassieres and other garments, said breast cup comprising an inner layer of finished fabric containing no bonding agent, an outer layer of finished fabric containing no bonding agent and an intermediate layer of non-woven fiberfill material, said intermediate layer being substantially thicker than said inner and outer layers, all of said layers being first adhered and laminated together with surface bonding agents to form a dry composite, said composite being heat and pressure molded dry without added bonding agent to form a unitary integral breast cup having smooth seamless interior, exterior and intermediate surfaces, said breast cup after molding being complete and ready for use in a garment.

2. The structure described in claim 1, each of said layers containing at least a substantial quantity of polyester material, and all of said layers having compatible heat forming characteristics.

3. The structure described in claim 2, each of said layers being formed entirely of polyester material.

4. A method of forming a complete molded breast cup for use in brassieres and other garments, said method comprising adhering with surface bonding agents the adjacent surfaces of an outer layer of finished fabric containing no bonding agent, an inner layer of finished fabric containing no bonding agent and a substantially thicker intermediate layer of nonwoven fiberfill material to each other to form a composite, drying said composite heat and pressure molding said dry composite without the addition of bonding agent into a three dimensional shape to form a unitary integral fiberfill breast cup having smooth seamless interior, exterior and intermediate surfaces, said breast cup after molding being complete and ready for use in a brassiere.

5. The method described in claim 4, in which each of said layers contains at least a substantial quantity of polyester material and all of said layers have compatible heat forming characteristics.

6. The method described in claim 5, in which each of said layers is formed entirely of polyester material.

7. The method described in claim 5, in which said layers of material are only lightly adhered to each other in forming said composite, so that said inner and outer layers are free to move with respect to intermediate layer during molding to avoid wrinkling of said inner and outer layers.

8. The method described in claim 7, in which the molds used to mold said breast cup are unheated.

9. The method described in claim 8, in which said composite is formed in a pair of complementary closed molds, in which no space is provided between the exterior of the male mold and the interior of the female mold when said molds are disposed in closed position.

10. The method described in claim 9, and placing said cups on a supporting blank of substantially identical shape immediately after said cups are molded to prevent wrinkling and deformation of said cups.

* * * * *